(12) United States Patent
Kanota et al.

(10) Patent No.: US 6,813,681 B1
(45) Date of Patent: Nov. 2, 2004

(54) INFORMATION RECORDING METHOD AND APPARATUS, INFORMATION REPRODUCING METHOD AND APPARATUS

(75) Inventors: Keiji Kanota, Kanagawa (JP); Noriyuki Yamamoto, Kanagawa (JP); Nobuko Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/261,335

(22) Filed: Mar. 3, 1999

(30) Foreign Application Priority Data

Mar. 4, 1998  (JP) ........................................... 10-052492

(51) Int. Cl.⁷ ............................. G06F 12/00; G11B 5/09
(52) U.S. Cl. ........................ 711/112; 360/48; 369/47.1
(58) Field of Search ....................... 711/112, 4; 360/48, 360/55, 22, 8, 15, 135; 369/47.1, 47.12, 84, 93; 386/13, 15, 39, 45, 85, 105–106

(56) References Cited

U.S. PATENT DOCUMENTS

| | | | | |
|---|---|---|---|---|
| 5,553,055 A | * | 9/1996 | Yokota et al. | 369/124.08 |
| 5,592,450 A | * | 1/1997 | Yonemitsu et al. | 386/96 |
| 5,796,534 A | * | 8/1998 | Yamamoto et al. | 360/48 |
| 5,859,740 A | * | 1/1999 | Takeda et al. | 360/77.02 |
| 6,058,084 A | * | 5/2000 | Yamamoto et al. | 369/47 |
| 6,084,731 A | * | 7/2000 | Uchida et al. | 360/48 |

FOREIGN PATENT DOCUMENTS

| | | |
|---|---|---|
| EP | 0 635 835 | 1/1995 |
| EP | 0 737 974 | 10/1996 |

OTHER PUBLICATIONS

Patent Abstracts of Japan "Rewritable Optical Recording Medium and Information Management Method" 08185675, Jul. 16, 1996 abstract only.

* cited by examiner

Primary Examiner—Denise Tran
(74) Attorney, Agent, or Firm—Frommer Lawrence & Haug LLP; William S. Frommer; Dennis M. Smid

(57) ABSTRACT

An information recording method and apparatus and an information reproducing method and apparatus in which AV data can be recorded or reproduced temporally continuously without producing fragmentation. To this end, the apparatus includes a storage unit 7 at least including a management information region and a user data region made up of plural logical blocks, and a recording unit 9 for continuously recording information signals from a recording start logical block to a recording end logical block in the user data region of the storage unit 7 and again recording information signals from the recording start logical block.

24 Claims, 15 Drawing Sheets

| TOC START LBA | DEFECT-LIST START LBA | AV DATA START LBA | ...... | BACKUP START LBA | BYTE 511 AP COUNT |
|---|---|---|---|---|---|

ROOT AREA

EDIT MODE (8.184 / 8.086Mbps)

| SECTOR | 0 | 244 | 1000/988 1023 |
| --- | --- | --- | --- |
| AV CLUSTER | | 524.288kB (1024sectors) | |

HP MODE (6.089 / 5.991Mbps)

| SECTOR | 0 | 204 | 746/732 767 |
| --- | --- | --- | --- |
| AV CLUSTER | | 393.216kB (768sectors) | |

SP MODE (3.994 / 3.895Mbps)

| SECTOR | 0 | 164 | 488/476 511 |
| --- | --- | --- | --- |
| AV CLUSTER | | 262.144kB (512sectors) | |

LP MODE (HHR) (1.899 / 1.800Mbps)

| SECTOR | 0 | 84 | 232/220 255 |
| --- | --- | --- | --- |
| AV CLUSTER | | 131.072kB (256sectors) | |

43.008kB | 118.784kB / 112.640kB

INFORMATION RECORDING METHOD AND APPARATUS, INFORMATION REPRODUCING METHOD AND APPARATUS

BACKGROUND OF THE INVENTION

1. Field of the Invention

This invention relates to an information recording method and apparatus, and an information reproducing method and apparatus for recording/reproducing information signals, such as moving picture data for a recording medium.

2. Description of the Related Art

In a filing system for a personal computer for controlling e.g., a conventional hard disc drive (HDD), the main theme has been to handle inherently discrete text data. The result is that, in such file system, such a file is produced in which, due to the recording/reproducing operations, logical addresses are constituted by non-contiguous sectors, thus producing file fragmentation due to recording/reproducing operations.

Meanwhile, in recording/reproducing temporally continuous AV data, such as acoustic or moving picture data, by an HDD, the continuous data transfer rate is crucial. However, if the file is recorded/reproduced by the above-described file system, the overhead indicating the management information such as recorded sector numbers, is voluminous, due to file fragmentation, thus consuming a lot of time for recording/reproduction to render it impossible to assure the minimum continuous data transfer rate. If it is impossible to assure the continuous data transfer rate, there may arise an inconvenience that the inherently temporally continuous AV data cannot be reproduced temporally continuously.

SUMMARY OF THE INVENTION

It is therefore an object of the present invention to provide an information recording method and apparatus, and an information reproducing method and apparatus for recording/reproducing temporally continuous AV data without producing the above-mentioned fragmentation.

In one aspect, the present invention provides an information recording apparatus including a disc-shaped recording medium at least having a management information region and a user data region made up of a plurality of logical blocks, and recording means for continuously recording information signals in the user data region of the storage means from a recording start logical block to a recording end logical block and for again recording the information signals from the recording start logical block.

With the present information recording apparatus, information signals are continuously recorded by recording means in the logical blocks of the disc-shaped recording medium.

In another aspect, the present invention provides an information recording method for recording information signals on a disc-shaped recording medium at least having a management information region and a user data region made up of a plurality of logical blocks, including continuously recording information signals in the user data region from a recording start logical block to a recording end logical block of the disc-shaped recording medium and again recording the information signals from the recording start logical block.

With the present information recording method, information signals are continuously recorded in the logical blocks of the disc-shaped recording medium.

In a further aspect, the present invention provides an information recording/reproducing apparatus including a disc-shaped recording medium at least having a management information region and a user data region made up of a plurality of logical blocks, recording means for continuously recording information signals in the user data region of the storage means from a recording start logical block to a recording end logical block and for again recording the information signals from the recording start logical block, and reproducing means for reproducing information signals stored in the recording means. The recording means and the reproducing means records information signals in the user data region of the disc-shaped recording medium, while reproducing the information signals recorded in the user data region of the disc-shaped recording medium.

In this information recording/reproducing apparatus, information signals are continuously recorded in logical blocks of the disc-shaped recording medium, while continuously recorded information signals are reproduced.

In yet another aspect, the present invention provides an information recording/reproducing method including continuously recording information signals from a recording start logical block to a recording end logical block on a disc-shaped recording medium having a management information region and a user data region made up of a plurality of logical blocks, and again recording information signals from the recording start logical block, and reproducing the information signals recorded in the user data region of the disc-shaped recording medium.

In this information recording/reproducing method, information signals are continuously recorded in logical blocks of the disc-shaped recording medium, while continuously recorded information signals are reproduced.

In the information recording method and apparatus of the present invention, the information signals are continuously recorded from the logical block of the leading end logical address to the trailing end logical block and are again recorded as from the logical block of the leading end logical address, thus enabling data to be recorded temporally continuously in the user data region. Thus, with the present information recording method and apparatus, continuity of recorded data is assured, there being no risk of fragmentation of recorded data. Since no data fragmentation is produced, the data overhead can be reduced to improve the continuous data transfer rate during reproduction.

Also, with the information recording/reproducing method and apparatus of the present invention, information signals are continuously recorded from the continuously recorded from the logical block of the leading end logical address to the trailing end logical block and are again recorded as from the logical block of the leading end logical address, while the information signals recorded are reproduced. Thus, with the present information recording/reproducing method and apparatus, continuity of the recorded data is assured, while information signals can be reproduced temporally continuously. Thus, with the present information recording/reproducing method and apparatus, there is no risk of fragmentation produced in the recorded information signals. Also, with the present information recording method and apparatus, since no data fragmentation is produced, it is possible to reduce the overhead of the information signals, thereby improving the continuous data transfer rate during reproduction. In addition, with the present information recording method and apparatus, the user data region of the recording medium can be split into plural regions for recording/reproduction, the frequency of recording can be hierarchized, thus realizing diversified application.

BRIEF DESCRIPTION OF THE DRAWINGS

FIG. 3 is a schematic view for illustrating the contents of a root area of a file system.

FIGS. 7A–D are schematic views for illustrating the capacity of an AV cluster in each recording mode.

DESCRIPTION OF THE PREFERRED EMBODIMENTS

Figure 1:
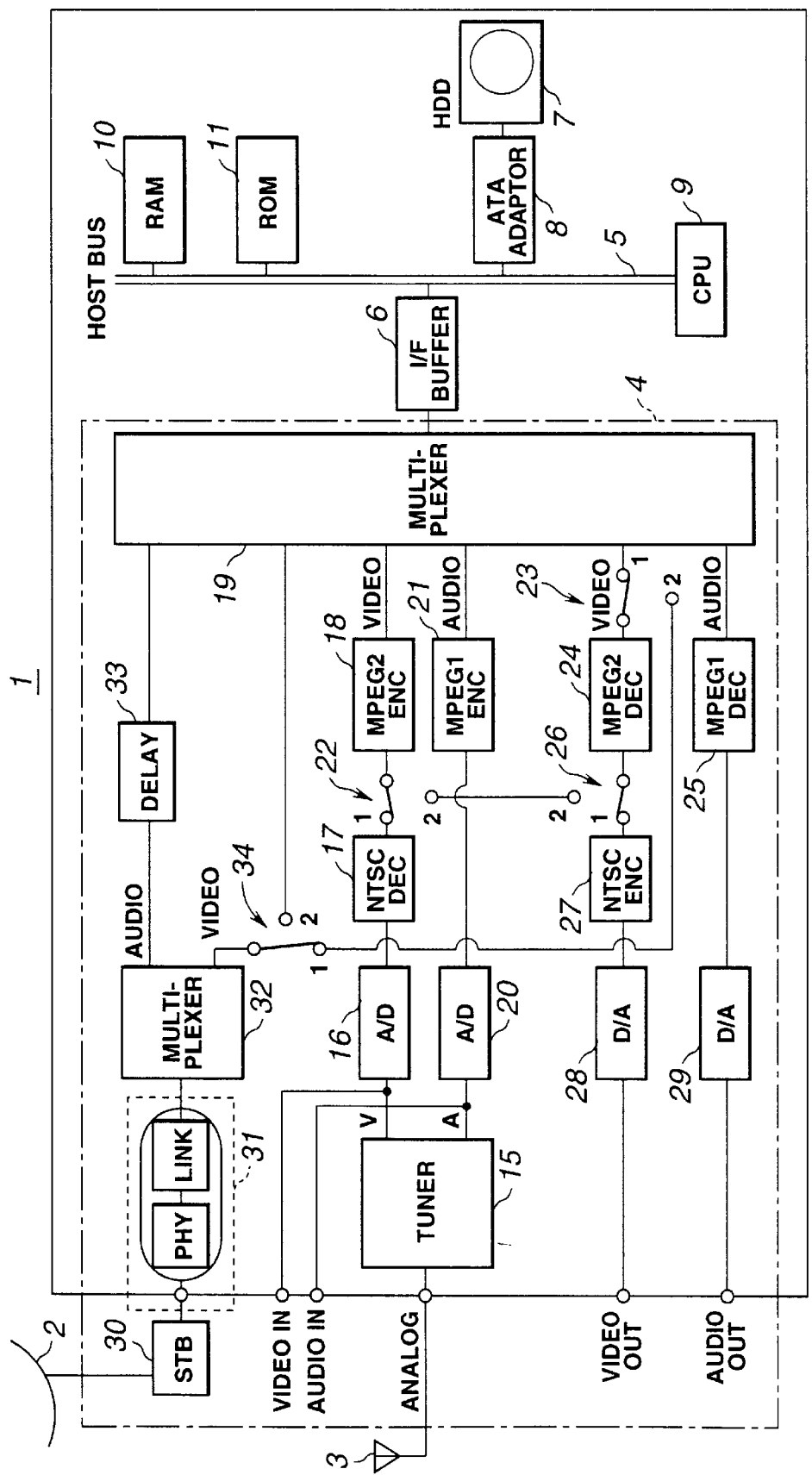
FIG. 1 is a schematic view showing an illustrative structure of an information recording/reproducing apparatus embodying the present invention.

Referring to the drawings, preferred embodiments of the present invention will be explained in detail.

FIG. 1 is a schematic view showing an illustrative structure of an information recording/reproducing apparatus 1 embodying the present invention. The information recording/reproducing apparatus 1, shown in FIG. 1, includes an antenna 2 for receiving digital data of the Moving Picture Experts Group System (MPEG system), an antenna 3 for receiving analog signals of, for example, the National Television System Committee (NTSC) system, a signal processing circuit 4 for signal-processing digital data and analog data received over antennas 2, 3, respectively, and a host bus 5 as a common bus for information transmission. The information recording/reproducing apparatus 1 also includes an interfacing buffer 6 for mediating information transmission between the signal processing circuit 4 and the host bus 5, a hard disc drive (HDD) 7, having a recording medium for recording the information thereon, and an AT attachment adapter (ATA) 8 for mediating information transmission between the host bus 5 and the HDD 7.

The host bus 5 is a parallel transmission line for transmission of the information among various parts of the information recording/reproducing apparatus 1.

The interfacing buffer 6 mediates transmission of an audio and/or visual digital data stream, referred to hereinafter simply as AV data, between the signal processing circuit 4 and the host bus 5. For example, the interfacing buffer 6 converts the transfer rate of the AV data or adjusts the transfer timing. This interfacing buffer 6 has an internal 2-bank RAM which is made up of two RAMs alternately switched for adjusting information transmission.

The HDD 7 is a is a disc apparatus for recording input AV data. The ATA adapter 8 is interposed between the host bus 5 and the HDD 7 for conversion between parallel data of the host bus 5 and the data-format data of the HDD 7.

The HDD 7 includes an internal recording medium for recording AV data. On this recording medium is recorded AV data multiplexed by a multiplexer 19 in accordance with a file system which will be explained subsequently. If loaded with a magnetic disc as a recording medium, the HDD 7 includes a magnetic head for recording temporally continuous AV data on the magnetic disc.

When recording continuous AV data on the magnetic disc, the HDD 7 causes the magnetic head to scan the magnetic disc from the outer rim towards the inner rim thereof to follow the tracks formed on the magnetic disc. When data has been recorded from the outermost rim to the innermost rim, the HDD 7 causes the magnetic head to be moved again to the outermost rim to record AV data. At this time, a routine HDD again records the information from the outermost rim after lapse of the time during which the magnetic head is moved from the innermost rim to the outermost rim and the rotational waiting time until the time of reaching the logical block address of initiating the recording. However, with this HDD 7, the rotational waiting time until the recording starting logical block address is set to zero to assure temporal AV data continuity.

That is, with the magnetic head in this HDD 7, the rotational waiting time is set to zero by calculating the position of the logical block address for recording starting arrayed at the outermost rim. That is, if the time for one complete revolution of the magnetic disc is r, the seek time until the magnetic head is moved from the innermost rim to the outermost rim is t, the angle through which the magnetic disc is rotated during this skew time t (skew angle) is θ, the sector number is n and the number of sectors for cone complete revolution is $n_0$, $$\theta > t/r \times 360° \quad (1)$$

and $$n(t/r \times n_0) - \alpha \quad (2).$$

In the above equation (2), α is the number of sectors of rotation during the time needed for the HDD 7 to construe a command from a CPU since the inputting of the command and to set the command in each circuit in the HDD 7. That is, the equation (1) indicates that, if the seek time t is approximately 5 ms and the time for one complete revolution r is approximately 10 ms, the skew angle is approximately 180°, meaning that the recording starting logical block address may be positioned with an offset of approximately 180° from the recording end logical block address. The sector number corresponding to the recording starting logical block address can be calculated by substituting a pre-set numerical value into the equation (2). Therefore, it is possible with the present HDD 7 to record non-interrupted data even in case of temporally continuous recording.

The information recording/reproducing apparatus 1 also includes the CPU 9 as a central processing unit for concentrated information processing, a RAM 10 as a volatile memory and a ROM 11 as a non-volatile memory.

The CPU 9 controls a series of operations of the information recording method by the present information recording/reproducing apparatus 1, such as data transfer or control operations for the HDD 7, by software control. The software, starting this series of operations, is recorded in, for example, a ROM 11, and is occasionally read out for execution. This CPU 9 operates under the reduced instruction set computer (RISC) system such that the CPU is a reduced instruction set computer in which the basic commands are simplified to reduce the number of commands for improving the processing speed.

This CPU 9 is connected to an actuating input unit, such as a keyboard, not shown, so that it is fed with an actuating input signal from the user. The CPU 9 is fed with an actuating input signal for commanding the recording and reproduction of, for example, AV data, to control the various portions of the information recording/reproducing apparatus 1 responsive to the actuating input signal.

In the ROM 11 is stored a file system as a control program as later explained. The file system, stored in the ROM 11, is read by the CPU 9. The CPU 9 reading this file system controls the recording/reproduction for the HDD.

The RAM 10, connected to the host bus 5, is a volatile memory for transient data storage. The ROM 11, connected to the host bus 5, is a non-volatile memory in which pre-set data and the software are recorded.

In the RAM 10 are stored a root, stored in the HDD 7 during startup and recording/reproduction, and the management information indicating the TOC. This management information is incidentally updated by the CPU 9 during startup and recording/reproduction.

The signal processing circuit 4 includes a tuner 15, fed with signals via antenna 3 receiving video and audio signals of the analog system, an A/D conversion circuit 16 for converting video signals entering the tuner 15 into digital data, and an NTSC decoder 17 fed with digital system video signals from the AID conversion circuit 16. The signal processing circuit 4 also includes an MPEG2 encoder 18 fed with the video signals converted into baseband signals by the NTSC decoder 17 and a multiplexer 19 of the MPEG system of the digital system.

This signal processing circuit 4 also includes an A/D conversion circuit 20 fed with audio signals entering the tuner 15 and an MPEG1 encoder 21 fed with audio signals converted into digital signals by the A/D conversion circuit 20.

The tuner 15 is fed with, for example, NTSC signals received by the antenna 3. The tuner 15 receives and detects the video and audio signals received by the antenna 3. The tuner 15 outputs the detected video signals to the A/D conversion circuit 16 while outputting the audio signals to the A/D conversion circuit 20.

The A/D conversion circuit 16 A/D converts the video signals from the video input terminal or the tuner 15 into video data. The A/D conversion circuit 16 also outputs the video data of, for example, the NTSC system to the NTSC decoder 17.

The NTSC decoder 17 is fed with the video data of the NTSC system from the A/D conversion circuit 16. This NTSC decoder 17 expands the input video data to generate baseband signals. The NTSC decoder 17 outputs the baseband signals to the MPEG2 encoder 18 via terminal 1 of a switch 22.

The MPEG2 encoder 18 compresses the baseband signals from the NTSC decoder 17. At this time, the MPEG2 encoder compresses the input baseband signals into digital data of the MPEG2 system. This MPEG2 encoder 18 encodes the input baseband signals at a compression rate specified by the CPU 9 so as to be an integer number multiple of the logical sector of the recording medium. That is, the MPEG2 encoder 18 performs compression so that the maximum data value of the input GOP and/or the I-frame will be data volume equal to an integer number multiple of the logical sector of the recording medium.

The MPEG2 encoder 18 is fed with baseband signals from an MPEG2 decoder 24 via terminal 2 of the switch 22 and terminal 2 of the switch 26. This MPEG2 encoder 18 encodes the baseband signals from the MPEG2 decoder 24 at a pre-set compression rate.

The tuner 15 outputs audio signals, among the input signals from the antenna 3, to the A/D conversion circuit 20. The A/D conversion circuit 20 A/D converts the input audio signals to audio data. This A/D conversion circuit 20 outputs the audio data to the MPEG1 encoder 21.

The MPEG1 encoder 21 compresses the audio data from the A/D conversion circuit 20 to output the compressed data to the multiplexer 19.

The multiplexer 19 multiplexes the video data from the MPEG2 encoder 18 and the audio data from the MPEG1 encoder 21. The multiplexer 19 compresses the MPEG signals along the time axis to VAVAVA . . . in GOP time units, where V and A are video data and audio data, respectively. The multiplexer 19 outputs the multiplexed AV data to the interfacing buffer 6.

The multiplexer 19 is fed via interfacing buffer 6 with AV data recorded on a recording medium in the HDD 7. The multiplexer 19 splits the AV data entering from the interfacing buffer 6 into video data and audio data. This multiplexer 19 outputs the video data obtained on splitting via terminal 2 to a multiplexer 32 via terminal 2 of the switch 34 and to the MPEG2 decoder 24 via terminal 1 of the switch 23. The multiplexer 32 outputs the audio data obtained on splitting to the multiplexer 32 via a delay circuit 33 and to an MPEG1 decoder 25.

The signal processing circuit 4 includes an antenna 2 for receiving digital data of the MPEG system, a set top box STB 30, a digital I/F circuit 31, the multiplexer 32 and the delay circuit 33.

The antenna 2 again receives digital data of, for example, the MPEG system. This antenna 2 outputs the received digital data as RF signals to the STB 30.

The STB 30 receives and detects the digital data from the antenna 2 at a front end. The STB 30 descrambles the scrambled digital data to output the resulting descrambled data to the digital I/F circuit 31.

The STB 30 is fed from the digital I/F circuit 31 with digital data. The STB 30 has an MPEG decoder enclosed therein. The STB 30 decodes the digital data from the digital I/F circuit 31, using the MPEG decoder to expand the compressed video data and audio data for conversion to video signals and audio signals.

The digital I/F circuit 31 has a physical layer/link layer processing circuit and performs signal processing, such as signal conversion, on digital data from the STB 30, to output the processed data to the multiplexer 32.

The digital I/F circuit 31 is also fed with digital data multiplexed from the video data and the audio data from the multiplexer 32. This digital I/F circuit 31 outputs the digital data to the STB 30.

The multiplexer 32 splits the digital data from the digital I/F circuit 31 into video data and audio data. The multiplexer 32 outputs the video data obtained on splitting to the MPEG2 decoder 24 via terminal 1 to the switch 34 and via terminal 2 of the switch 23. This multiplexer 32 outputs the audio data to the delay circuit 33.

The multiplexer 32 is fed with video data from the multiplexer 19 via switch 34 and with audio data via the delay circuit 33. The multiplexer 32 multiplexes the input video and audio data to output the multiplexed data to the digital I/F circuit 31.

The delay circuit 33 adjusts the delay of the audio data from the multiplexer 32. This delay circuit 33 delays the input video or audio data to adjust the time difference between the input video and audio data to output the audio data to the multiplexer 32.

The delay circuit 33 is fed as input only with audio data among the video and audio data as split by the multiplexer 19. The delay circuit 33 adjusts the delay with respect to the video data to output the audio data to the multiplexer 32.

The signal processing circuit 4 includes the MPEG2 decoder 24 fed with video data via terminal 2 of the switch 23, the MPEG1 decoder 25 fed with audio data obtained on splitting by the multiplexer 19, and an NTSC encoder 27 fed with video data decoded by the MPEG2 decoder 24 via terminal 1 of the switch 26. The signal processing circuit 4 also includes a D/A conversion circuit 28 fed with data encoded by the NTSC encoder 27 and a D/A converting circuit 29 fed with audio data decoded by the MPEG1 decoder 25.

The MPEG2 decoder 24 is fed via terminal 1 of the switch 23 with video data obtained in such a manner that the AV data recorded on the HDD 7 is read out by the data transfer software of the CPU 9 and split via ATA adapter 8, host bus 5 and interfacing buffer 6 by the multiplexer 19. This MPEG2 decoder 24 expands the compressed input video data. Also, the MPEG2 decoder 24 is fed video data via terminal 2 of the switch 23 from the multiplexer 32. The MPEG2 decoder 24 outputs to the switch 26 the video data obtained on expanding the input video data.

The switch 23 is controlled so that it is coupled to the terminal 2 or to the terminal 1 when the video data from the multiplexer 32 is entered to the MPEG2 decoder 24 or when the video data from the multiplexer is entered to the MPEG2 decoder 24, respectively.

Also, the switch 26 is controlled so that it is couped to the terminal 2 or to the terminal 1 when video data from the MPEG2 decoder 24 is outputted to the switch 22 or to the NTSC encoder 27, respectively.

The NTSC encoder 27 is fed via terminal 1 of the switch 26 with video data decoded by the MPEG2 decoder 24. This NTSC encoder 27 compresses the input video data by the NTSC system to output the compressed data to the D/A conversion circuit 28.

The D/A conversion circuit 28 D/A converts the video data from the NTSC encoder 27 into video signals. This D/A conversion circuit 28 outputs the video signals to a video output terminal.

The MPEG1 decoder 25 is fed with audio data obtained on splitting by the multiplexer 19. This MPEG1 decoder 25 expands the input audio data. This MPEG1 decoder 25 outputs the expanded audio data to the D/A converting circuit 29.

The D/A converting circuit 29 D/A converts the audio data from the MPEG1 decoder 25 into audio signals. This D/A converting circuit 29 outputs the audio signals to an audio output terminal.

When recording the digital data of the MPEG system received by the antenna 2 on the recording medium in the HDD 7, the signal processing circuit 4 outputs the digital data via STB 30 and digital I/F circuit 31 to the multiplexer 32.

The multiplexer 32 separates the input digital data into video data and audio data. The multiplexer 32 outputs the audio data to the delay circuit 33.

Also, the multiplexer 32 outputs the video data via switch 34 and switch 23 to the MPEG2 decoder 24. At this time, control is made so that the movable contacts of the switches 34, 23 are set to the terminals 1 and 2, respectively.

The MPEG2 decoder 24 expands the compressed video data to output the expanded data via switches 26, 22 to the MPEG2 encoder 18. At this time, control is made so that the switches 26, 22 are connected to the terminal 2.

The MPEG2 encoder 18 compresses video data entered at a pre-set compression rate. At this time, the MPEG2 encoder 18 compresses the GOP and/or the I-picture at a compression rate which is equal to an integer number times the logical sector of the recording medium in the HDD 7.

The audio data delayed by the delay circuit 33 is outputted to the multiplexer 19 under timing control, while the video data from the m18 is outputted to the multiplexer 19.

The multiplexer 19 multiplexes the input video and audio data to generate AV data to record the generated AV data on the recording medium in the HDD 7 via ATA adapter 8. Thus, with the present recording/reproducing apparatus 1, MPEG data is recorded in terms of logical sectors of the recording medium asa unit.

Also, when recording analog signals of the NTSC system received via antenna 3 on the recording medium in the HDD 7, analog signals of the NTSC system are outputted to the tuner 15.

The tuner 15 detects analog signals from the antenna 3 to output video signals and audio signals to the A/D conversion circuit 16 and to the A/D conversion circuit 20, respectively. At this time, the A/D conversion circuit 16 may be fed with video signals from a video input terminal, while the A/D conversion circuit 20 may be fed with audio signals from the audio input terminal.

The A/D conversion circuit 16 A/D converts the input video signals into video data which is outputted to the NTSC decoder 17.

The NTSC decoder 17 expands the video data from the A/D conversion circuit 16 to convert the video data into baseband signals which are outputted to the MPEG2 encoder 18. At this time, the switch 22 is controlled to be connected to the terminal 1.

The MPEG2 encoder 18 is fed via switch 22 with baseband signals. The MPEG2 encoder 18 encodes the input baseband signals into MPEG data at a compression rate specified by the CPU 9 to form video data of the MPEG2 system. The MPEG2 encoder 18 performs encoding so that the GOP and/or the I-frame will be compressed at a rate of an integer number multiple of the logical sector of the recording medium in the HDD 7. The MPEG2 encoder 18 outputs the video to the multiplexer 19.

On the other hand, the A/D conversion circuit 20, fed with audio signals from the tuner 15, A/D converts the audio signals into audio data which is outputted as audio data to the MPEG1 encoder 21.

The MPEG1 encoder 21 encodes the audio data from the A/D conversion circuit 20 in accordance with the MPEG1 system to output the encoded data to the multiplexer 19.

The multiplexer 19 multiplexes the video data fed from the MPEG2 encoder 18 and the audio data fed from the MPEG1 encoder 21 to generate AV data.

The multiplexer 19 records the generated AV data via interfacing buffer 6, host bus 5 and the ATA adapter 8 on a recording medium in the HDD 7. Thus, with the present recording/reproducing apparatus 1, AV data of the MPEG system are recorded in terms of the logical sectors of the recording medium asa unit.

When reproducing the AV data recorded on the recording medium in the HDD 7, the AV data stored in the HDD 7 is read out by a data transfer software started by the CPU 9 in terms of the logical sectors of the recording medium as a unit. It is possible for the CPU 9 to read out AV data stored in the HDD 7 by, for example, various variable speed reproducing modes under software control.

In the present recording/reproducing apparatus 1, AV data read out from the HDD 7 is entered to the multiplexer 19 via ATA adapter 8, host bus 5 and interfacing buffer 6. This multiplexer 19 splits the input AV data into video data and audio data.

When reproducing the AV data recorded on the recording medium as digital data, the signal processing circuit 4 outputs the video data from the multiplexer 19 via switch 34 to the multiplexer 32, while delay-adjusting the audio data in the delay circuit 33 to output the delay-adjusted data to the multiplexer 32.

The multiplexer 32 multiplexes the input audio and video data to output the multiplexed data to the digital I/F circuit 31. The audio data and the video data are entered to the STB 30 and converted by the MPEG decoder in the STB 30 into audio and video signals which may be reproduced by variable-speed reproduction, seamless reproduction and non-linear edit reproduction under software control by the CPU 9.

If the AV data recorded on the recording medium by the signal processing circuit 4 is to be reproduced as analog signals, video data is outputted from the multiplexer 19 via terminal 1 of the switch 23 to the MPEG2 decoder 24.

The MPEG2 decoder 24 decodes the video data from the multiplexer 19 to output the decoded data via terminal 1 of the switch 26 to the NTSC encoder 27.

The NTSC encoder 27 converts the digital data from the MPEG2 decoder 24 into NTSC system video data. The NTSC encoder 27 outputs the NTSC system video data to the D/A conversion circuit 28.

The D/A conversion circuit 28 D/A converts video data from the NTSC encoder 27 into NTSC system video signals which are outputted to a video output terminal.

The multiplexer 19 outputs the audio data to the MPEG1 decoder 25, which then decodes the audio data from the multiplexer 19 to output the decoded data to the D/A converting circuit 29.

The D/A converting circuit 29 D/A converts audio signals from the MPEG1 decoder 25 to output the converted signals to an audio output terminal.

Thus, when recording digital signals compressed in accordance with the MPEG system, the information recording/reproducing apparatus 1 causes the MPEG2 decoder 24 to decode the data while causing the MPEG2 encoder 18 to encode the data at a pre-set compression rate equal to an integer number multiple of the logical sectors of the hard disc for recording. On the other hand, if fed with the NTSC system signals, the information recording/reproducing apparatus 1 causes the MPEG2 encoder 18 to encode the signals for recording. Therefore, in reproducing recorded digital data, recorded digital data can be reproduced simply by specifying the address information of the hard disc using, for example, the data transfer hardware, thus assuring facilitated accessing to the hard disc. Thus, with the present information recording/reproducing apparatus 1, variable readout speeds can be used for reproduction, thus allowing to use a variety of reproducing systems.

In the above-described information recording/reproducing apparatus 1, a compression rate corresponding to an integer number multiple of the logical sector of the hard disc is used for compression by the MPEG2 encoder 18. It is however possible with the MPEG2 encoder 18 to compress data at a plurality of fixed rates.

That is, if AV data compressed and recorded on a hard disc is used for editing, the compression rate of 8 Mbps may be used, whereas, it the data is used for SP (standard playing) or LP (long playing), the compression rates of 4 Mbps or 2 Mbps may be used, respectively. If the AV data recorded on the hard disc on the information recording/reproducing apparatus 1 is to be reproduced, the data transfer software may be controlled in the CPU 9 to vary the reading capacity in order to perform reproduction as described above.

Figure 2:
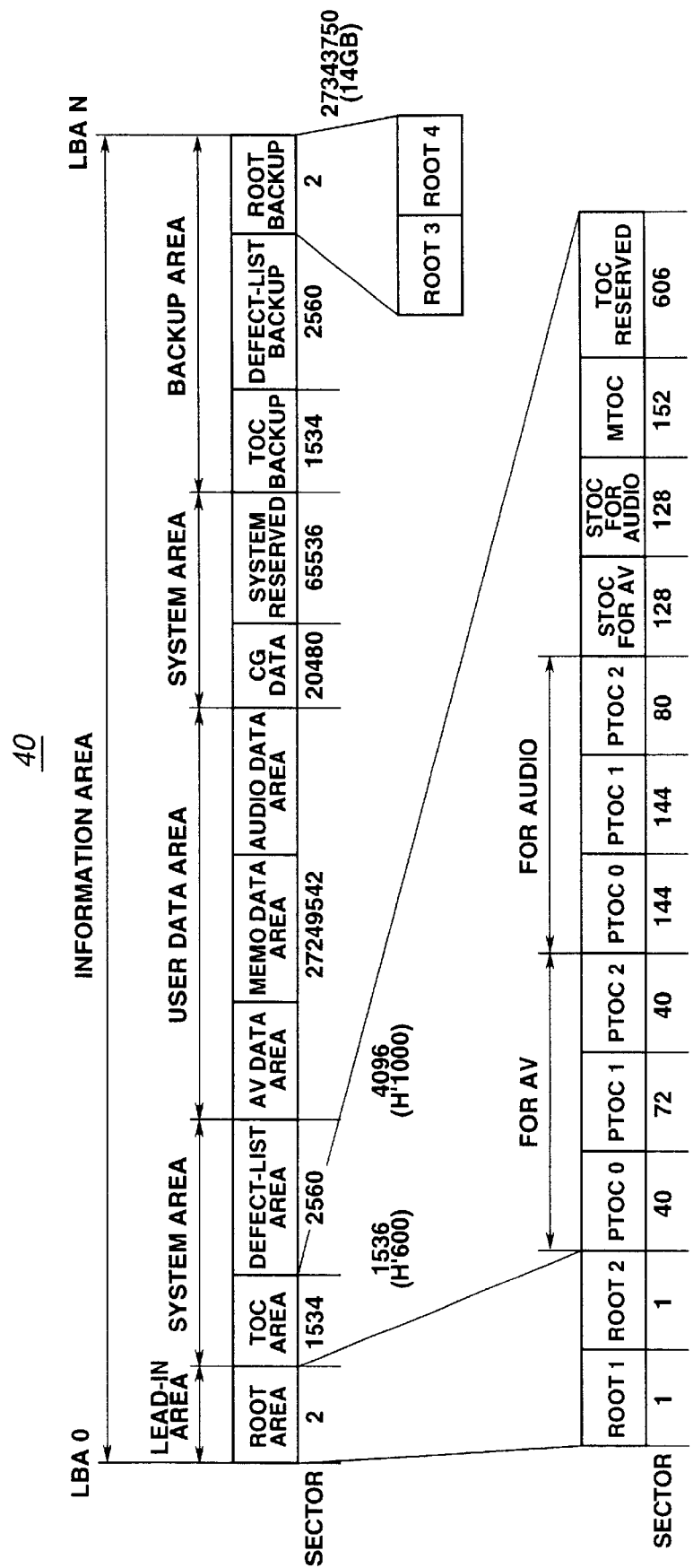
FIG. 2 is a schematic view showing a file system housed in a ROM.

The file system stored in the ROM 11 is explained. FIG. 2 shows an illustrative structure of the file system 40. In this file system 40, the capacity of approximately 14 GB from the leading end LBA 0 up to the trailing end LBA N constitutes an information area.

The file system 40 has its information area made up of a lead-in region, a first system region, a user data region, a second system region and a back-up area.

The lead-in region is two sectors from the leading end LBA 0 and represents a rot area. Referring to FIG. 3, this root area stores a start LBA of a table-of-contents (TOC) area, a start LBA for a defect list area, a start LBA for the user data region and a start LBA for a backup region. In this root area, there are also stored a start LBA of an AV data area of the user data region (referred to hereinafter as a recording start LBA), a memo data area start LBA and a start LBA for the audio data area. Thus, the root area stores the split position information specifying the overall structure of the file system 40.

This root area is made up a root 1 and a root 2 and, as fail-safe measure, the same contents are stated therein.

At the trailing end of the root area is stored an A P count which is data incremented each time the root area is rewritten. This A P count is arranged at a position sub-dividing the lead-in region from the system region.

The first system region is made up of a TOC area of 1534 sectors and a defect list area of 2560 sectors. In the TOC area and in the defect list area, there are stored the management information for AV data recorded in the user data region and a table for managing second-order defects produced in the user data region, respectively.

The TOC area may be configured similarly to that of a mini-disc (MD) and is composed of PTOC0 to 2 used for moving picture data, PTOC0 to 2 used for audio data, STOC for moving pictures, an STOC for audio, MTOC and TOC reserved as a reservation area for TOC.

Figure 4:
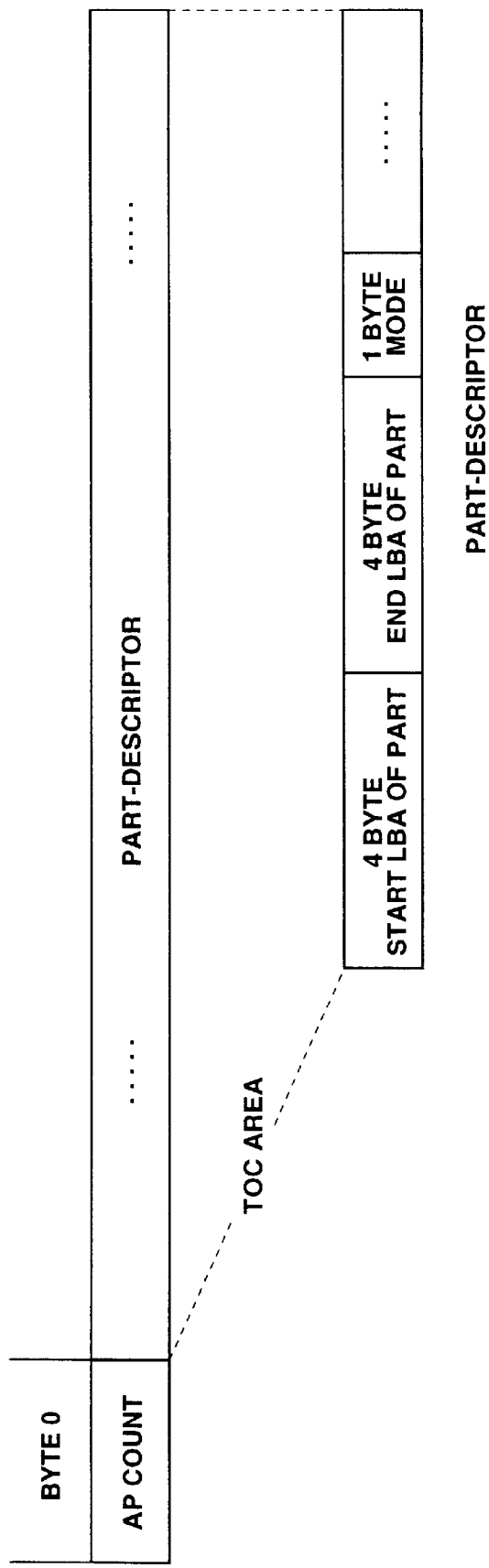
FIG. 4 is a schematic view showing the contents of a TOC area of the file system.

Referring to FIG. 4, the A P count is stored in the leading end LBA of the TOC area, and the split position information and the recording mode information on the information stored in the user data region are stored at back of the A P count. This recording mode information is the information specifying the compression rate, such as the compression rate in the compression system.

In this TOC area, there are recorded, for every information portion stored in the user data region, the split position information specifying the 4-byte start address LBA and the end LBA and the 1-byte recording mode information.

Figure 5:
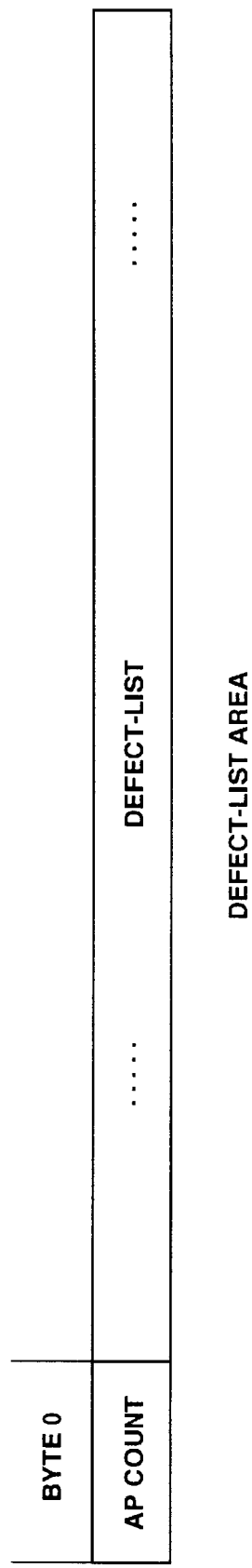
FIG. 5 is a schematic view showing the contents of a defect list area of the file system.

Referring to FIG. 5, the A P count is stored in the leading end LBA and a table for managing the second-order defect is stored at back of the A P count.

Referring to FIG. 2 the user data region is made up of 27249542 sectors and includes an AV data area, a memo data area and an audio data area. The size of the respective areas of the user data region corresponds to the split position information stored in the above-mentioned root area.

In this user data region, the AV data area, memo data area and the audio data area are arrayed in this sequence from the outer rim side of the disc-shaped recording medium. In the AV data area, memo data area and the audio data area, addresses indicating the leading end LBA is recorded in the root area.

In the AV data area is recorded compressed AV data. Among data recorded in the AV data area, there are moving picture data compressed in accordance with the MPEG2 system, and data compressed in accordance with the wavelet compression system. Also, in this AV data area, the data are recorded with respective recording modes which will give the compression rate of the MPEG2 compression system equal to, for example, 8 Mbps, 6 Mbps, 4 Mbps and 2 Mbps. In the wavelet compression system, the data are recorded with respective recording modes which will give the compression rate equal to, for example, 8 Mbps and 6 Mbps.

In the AV data area, mainly the moving picture data and audio data ancillary to the moving picture data are recorded in temporal continuation to its recording start LBA. In this AV data area, data are sequentially recorded as from the recording start LBA and, when the AV data has been recorded in the total area, the AV data is again recorded by overwriting as from the recording start LBA, by way of recording by a so-called ring storage structure. When reproducing the AV data recorded in this AV data area, it is reproduced by temporally continuous reproduction.

Figure 6:
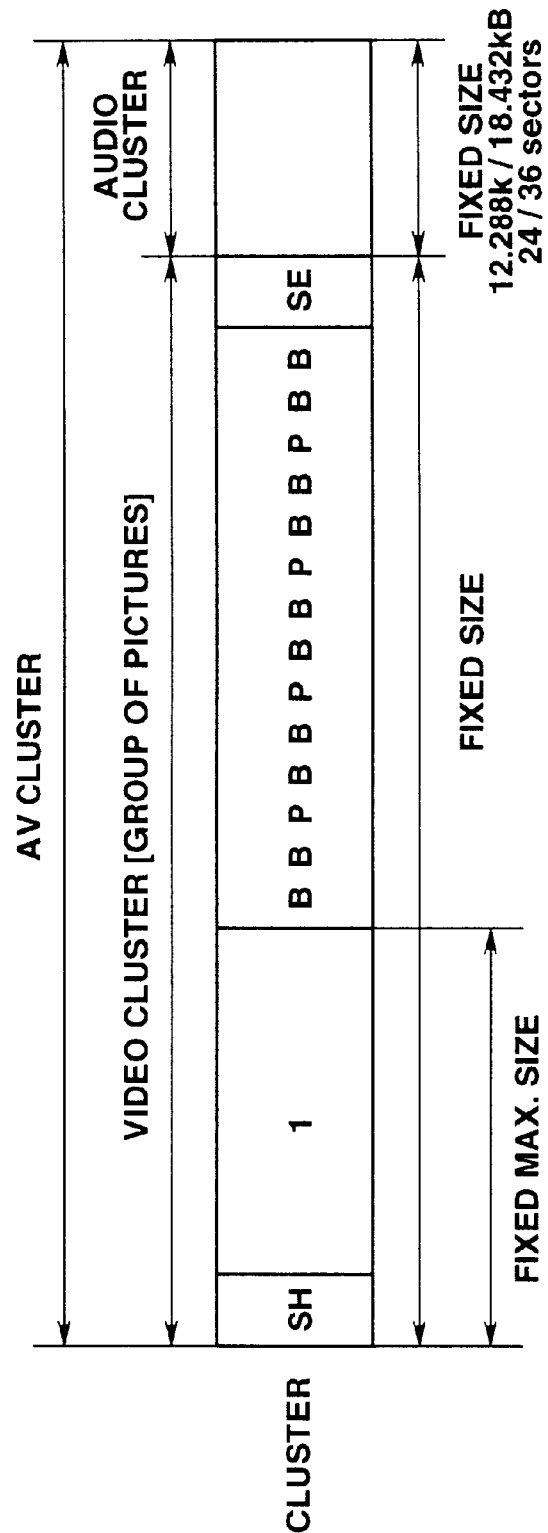
FIG. 6 is a schematic view showing an illustrative structure of an AV cluster stored in the user data region.

In the AV data area, moving picture data and audio data are recorded with an AV cluster shown in FIG. 6 as a recording unit. This AV cluster is made up of a sequence header code (SH), indicating the sequence layer start synchronization code, a group-of-pictures (GOP) and a sequence end code (SE), and an audio cluster.

In the AV data area, the compression rate is selected by the CPU 9 so that the compression rate of the video cluster and the audio cluster will be an integer number times the sector unit, and the video cluster and the audio cluster are compressed by this compression rate and recorded on the recording medium in the HDD 7. This AV data area has $2^n$ sectors subject to selection of the compression rate.

Each GOP is made up of an I-picture, obtained on encoding using an intra-frame prediction, a P-picture, obtained on encoding using an inter-frame forward prediction, and a B-picture obtained using bi-directional coding. In the present embodiment, GOP parameters are set so that M=3 and N=15. That is, in the present embodiment, each GOP is made up of 15 pictures, with the period of the I- or P-pictures being 3. The I-picture has the maximum size of a fixed capacity, with the GOP size also being of a fixed capacity.

In the audio cluster, audio data corresponding to the GOP is stored. This audio data is compressed and recorded in accordance with the MPEG Audio system or the ATRAC system. The audio cluster is of a fixed size in meeting with a GOP. In the present embodiment, this audio cluster is compressed so that the audio cluster is made up of 24 sectors or 12.288 kB or made up of 36 sectors or 18.432 kB if the cluster is compressed in the MPEG audio system or in the ATRAC system, respectively. The video cluster is compressed with the compression rate being varied in meeting with variation in the audio cluster capacity in order to provide for a fixed capacity of the AV cluster in its entirety.

The AV data area is recorded in the HDD 7 with a variable size depending on the compression rate in association with the recording mode. If the compression rate of the MPEG2 system is 8.184/8.086 Mbps (edit mode), the AV data area in its entirety is 524.288 kB (1024 sectors), with the I-picture being 124.928 kB and the GOP being 512 kB/524.288 kB, as shown in FIG. 7*a*.

If the compression rate of the MPEG2 system is 6.089/ 5.991 Mbps (HP mode), the AV data area in its entirety is 393.216 kB (768 sectors), with the I-picture being 104.448 kB and the GOP being 380.928 KB/374.784 kB, as shown in FIG. 7*b*.

If the compression rate of the MPEG2 system is 3.994/ 3.895 Mbps (SP mode), the AV data area in its entirety is 262.144 kB (512 sectors), with the I-picture being 83.968 kB and the GOP being 249.856 KB/243.712 KB, as shown in FIG. 7*c*.

If the compression rate of the MPEG2 system is 1.899/ 1.800 Mbps (LP mode), the AV data area in its entirety is 131.072 kB (256 sectors), with the I-picture being 43.008 kB and the GOP being 118.784 KB/112.640 KB, as shown in FIG. 7*d*.

Of the AV data recorded in the above-mentioned AV data area, only specified AV data selected by an actuating input signal by the user is recorded. The recording format etc of the memo data area is similar to that of the AV data area and is of the ring storage structure in which the data is recorded temporally continuously. The memo data area is usually smaller in capacity than the AV data area.

In the audio data area, audio data, such as still picture data, is recorded in the memo data area. In distinction from the above-mentioned AV data area or memo data area, the audio data is not recorded temporally continuously and are recorded/reproduced by random accessing.

Figure 8:
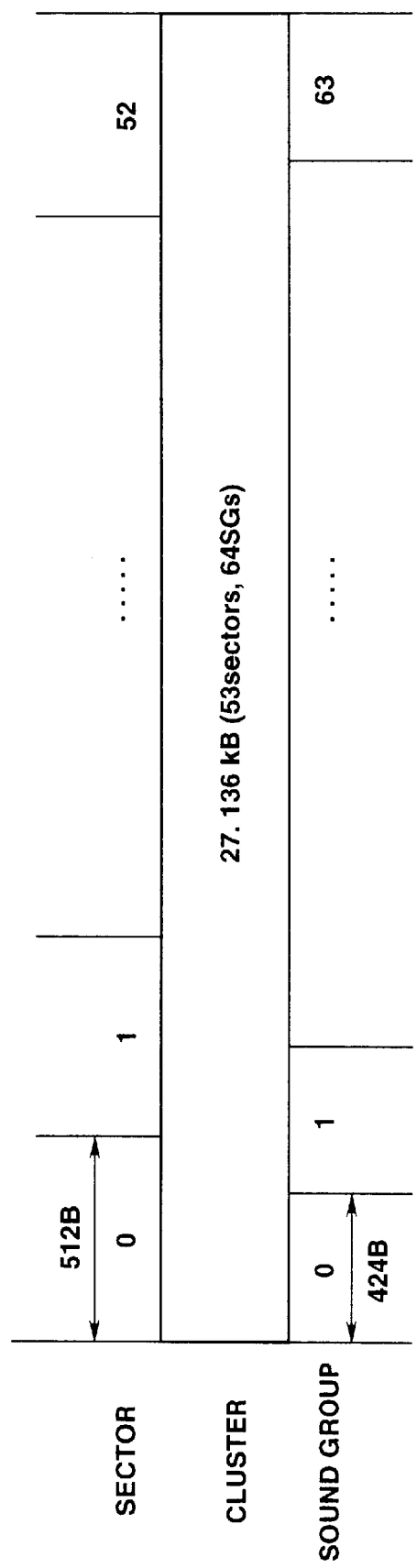
FIG. 8 is a schematic view for illustrating audio data stored in the AV cluster.

FIG. 8 shows an example of the audio data compression system in which the ATRAC system is used as a compression system for audio data stored in the audio data area. The audio data recorded in this audio data area is compressed/ expanded in terms of a sound group as a unit and is recorded as a 424 byte data. Since the data is recorded on the HDD 7 in terms of 512 bytes as a sector as a unit, the audio data is recorded with the least common multiple of the 424 bytes and 512 bytes as a recording unit. In the present embodiment, the least common multiple of 424 bytes and 512 bytes is 27136, so that the audio data area is made up of 27.136 KB, made up of 53 sectors and 64 sound groups.

Figure 9:
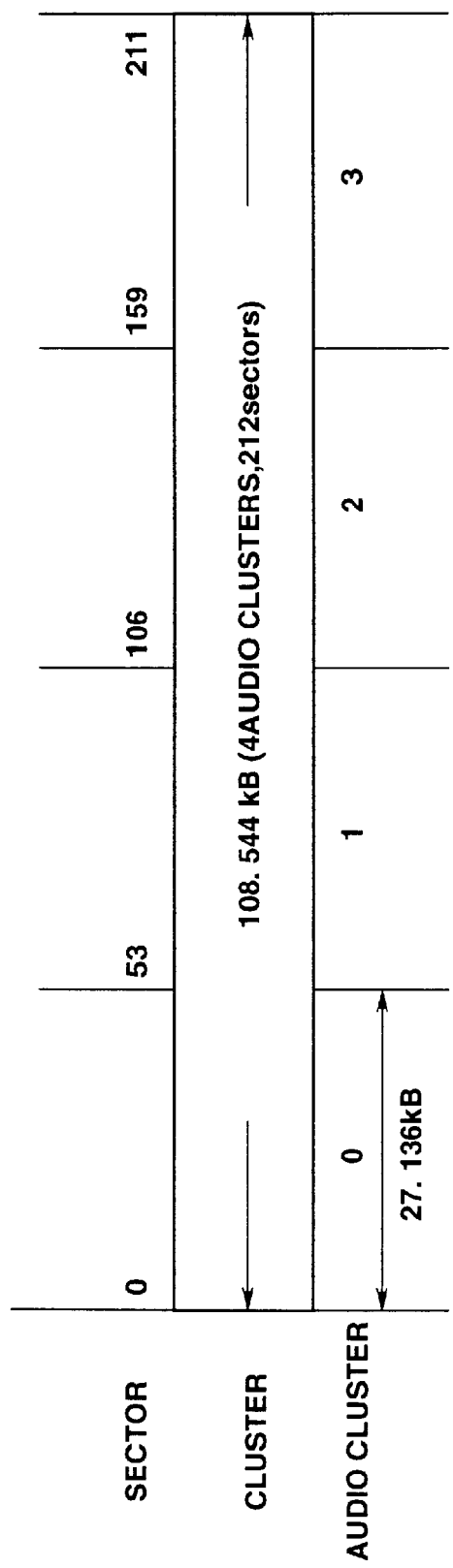
FIG. 9 is a schematic view for illustrating a still picture cluster stored in audio data.

The still picture data stored in the audio data area is compressed in accordance with the Joint Photographic Coding Experts Group (JPEG) system, and is made up of 212 sectors, as shown in FIG. 9, with four audio clusters being stored as still picture clusters. This still picture cluster has a recording unit of 27.136 KB.

The second system region is constituted as a reserve area and is made up of a CD data area of 20480 sectors and a system reserve area.

The backup region has the contents similar to those of the above-mentioned lead-in region and first system region, as shown in FIG. 2. This backup area is utilized for fail-safe measures, for example, by directly copying the contents of the lead-in region and the system region.

In distinction from the lead-in region and the system region, this backup region is designed so that the root area will be the trailing end LBA. That is, in this backup region, the capacity from LBA 0 to LBA N, for example, is fixed, so that, even if the lead-in region cannot be reproduced by malfunctions, the backup region can be accessed to reproduce the split position information in the recording medium.

The CPU 9 stores AV data etc in the recording medium in the HDD 7 in accordance with this file system 40. Also, the CPU 9 is responsive to an actuating input signal from the user to split the above-mentioned AV data area. At this time, the CPU splits the AV data area and the memo data area responsive to the actuating input signal via the ATA adapter 8. The recording format of the AV data area and the memo data area split by the CPU 9 is of the ring storage structure, similarly to the above-described structure, such that, if the data is sequentially recorded from the leading end LBA until the AV data is recorded in the entire area, the AV data is again recorded by overwriting beginning from the leading end LBA. The AV data recorded in this AV data area is reproduced temporally continuously.

Therefore, in tis information recording/reproducing apparatus, plural memo data areas can be provided responsive to the actuating input signal from the user. The recording frequency can be hierarchically arranged by the provision of the plural rings.

As embodiments of the use of the information recording/reproducing apparatus 1, an AV data area is set as an area for perpetually recording the analog and digital broadcasting programs. Since the AV data area is of the ring storage structure, as described above, it is determined by the recording capacity as set and by the compression rate of recorded AV data, such that overwrite recording occurs after lapse of a pre-set time. For example, if the capacity of the AV data area is for 7 hours of the AV data volume, overwriting recording occurs after seven hours. In the AV data area having the ring storage structure, the AV data which the user desired to keep is erased after lapse of seven hours. However, this inconvenience is evaded by providing a memo data area separately from the AV data area. That is, in the present information recording/reproducing apparatus 1, only AV data which the user desires to keep, among the AV data recorded in the AV data area, is recorded in the memo data area, thus assuring longer recoding than is possible with the AV data area. The reason is that it is possible to reduce the frequency of recording for the memo data area significantly as compared to that for the AV data area.

For example, in the present information recording/reproducing apparatus 1, the AV data area, the first memo data area smaller in capacity than the AV data area and the second memo data area smaller in capacity than the second memo data area are set by an actuating input signal from the user. If an actuating input signal for recording at least part of the AV data in the AV data area is sent, the CPU 9 copies and records the AV data in the first memo data area. If an actuating input signal for recording at least part of the AV data recorded in the first memo data area is supplied, the CPU 9 copies and records the AV data in the second memo data area.

By hierarchically setting the memo data area, it is possible to reduce the frequency of recording for the second memo data area as compared to that for the first memo data.

Also, when AV data from the multiplexer 19 is recorded on the HDD 7 by generating and outputting an ATA command, the CPU 9 outputs a control signal to the MPEG2 decoder 24 to control the compression rate, as a result of which AV data recorded on the HDD 7 is encoded for compression at a specified compression rate. At this time, the compressed Av data is of such a data volume in which the maximum value of the GOP and/or the I-frame is equal to a data volume equal to an integer number times the logical sector of the recording medium of the HDD 7, as discussed above. This compression rate is determined depending on the recording mode specified by the actuating input signal from the user.

Figure 10:
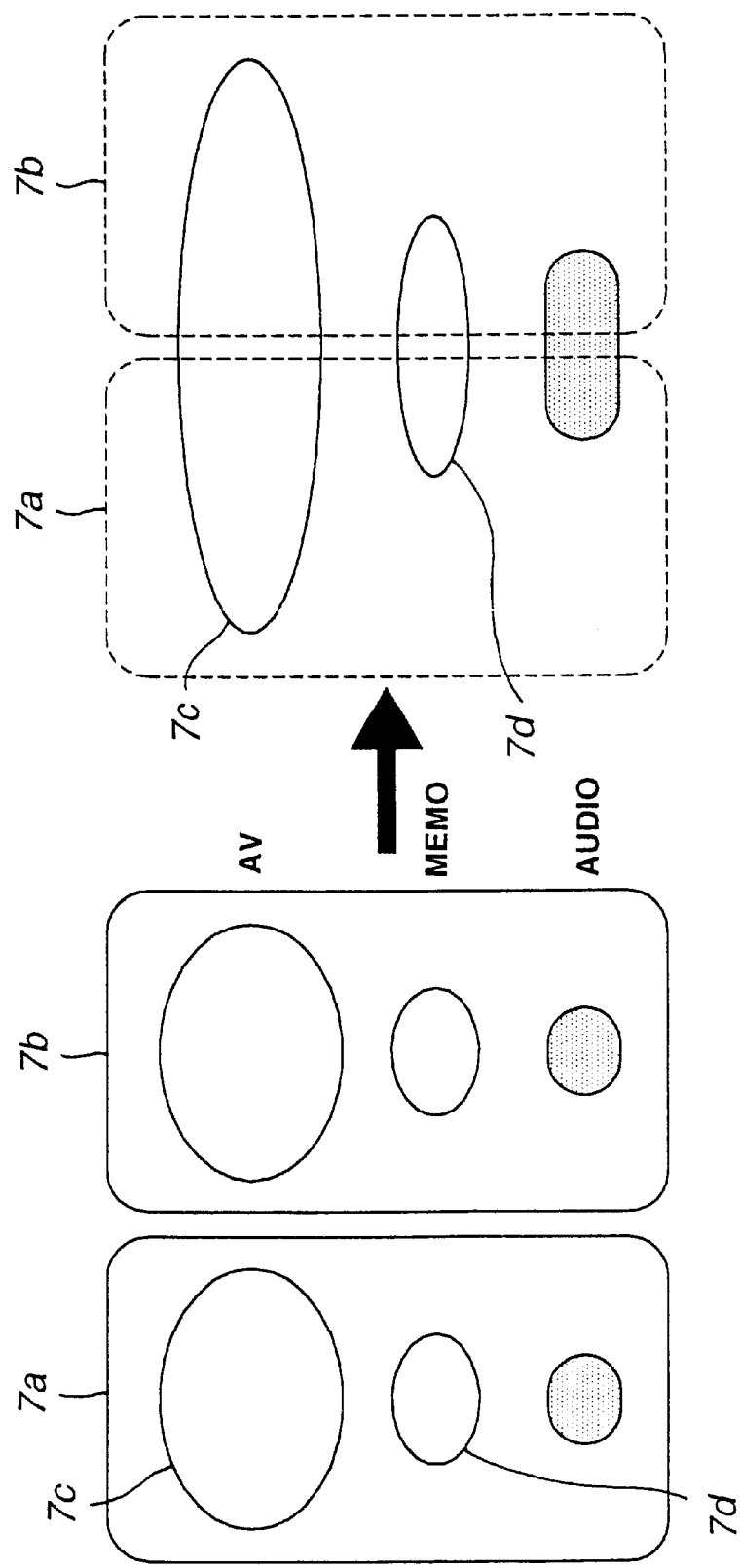
FIG. 10 is a conceptual view for illustrating recording/reproduction with twice the capacity of the AV data area and the memo data area in the information recording/reproducing apparatus having two HDDs.

If the CPU 9 has N HDDs 7, the capacity of the AV data area and the memo data area may be N-tupled depending on the actuating input signal from the user. Thus, with the present information recording/reproducing apparatus 1, AV data can be recorded temporally continuously not only on a sole HDD 7 but also on plural HDDs 7. If the information recording/reproducing apparatus 1 has two HDDs 7a, 7b, as shown in FIG. 10, the capacity of the AV data area 7c and that of the memory data area 7d can be doubled, as shown in FIG. 10.

Also, with the information recording/reproducing apparatus 1 having N HDDs 7, as described above, the number of the memo data areas can be N-tupled depending on the actuating input signal. By N-tupling the number of the memo data areas, it is possible to increase the depth of the hierarchical structure of the file system.

Moreover, in this information recording/reproducing apparatus 1, the AV data area can be split into an inner rim portion and an outer rim portion of the recording medium in order to effect recording/reproduction in the shape of a letter eight on a sole HDD 7. That is, in this HDD 7, the recording in the shape of the letter eight can be realized by recording the AV data in the outer rim portion beginning from the outer rim side recording start LBA towards the inner rim side recording end LBA, by recording in the inner rim portion beginning from the inner rim side recording start LBA towards the outer rim side recording end LBA and by again recording from the outer rim side on the outer rim side towards the inner rim side LBA. By recording in the shape of the letter eight, it is possible with the present information recording/reproducing apparatus 1 to reduce the seek time of, for example, a magnetic head, to record the AV data temporally continuously without interruptions.

An illustrative operation of the above-described information recording/reproducing apparatus 1 is hereinafter explained.

Figure 11:
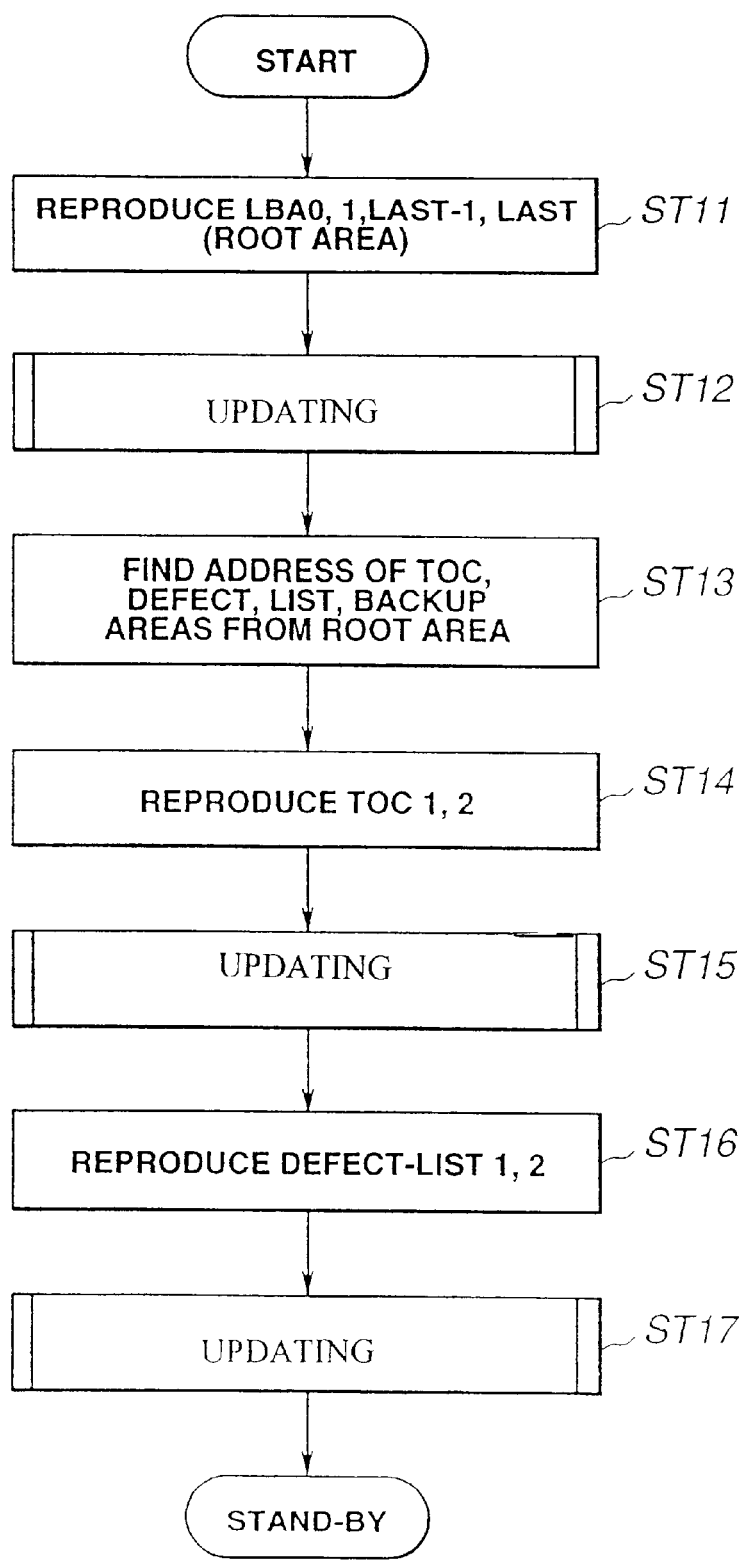
FIG. 11 is a flowchart for illustrating the processing on startup of an information recording/reproducing apparatus embodying the present invention.

If fed with the power from a power source, an initializing operation as shown in FIG. 11 is initiated. That is, in the information recording/reproducing apparatus 1, the CPU 9 manages control at step ST11 to read the A P count along with the split position information stored in a root area in a lead-in region of the HDD 7.

The CPU 9 also manages control to read the contents of the root area from the leading end LBA 0 and LBA 1 and to reproduce the data beginning from the trailing end LBS to read the contents of the root area in the backup region. The CPU 9 thus proceeds to the updating processing at step ST12 and thence to the processing at step ST13. This updating processing will be explained subsequently.

At step ST13, the CPU 9 finds addresses of the TOC area, defect list area and the backup region based on the split position information stored in the root area selected by the above-mentioned updating processing, before proceeding to step ST14.

At step ST14, the CPU 9 reproduces the TOC area, based on the TOC area of the system region and the TOC area of the backup region, as found at step ST13, to reproduce the TOC area. At step ST15, the CPU 9 performs updating processing to update the TOC area before proceeding toe step ST16. This updating processing will be explained subsequently.

At step ST16, the CPU 9 reproduces the defect list area of the system region and the backup region, based on the splitting position information of the root area updated by the processing at step ST12, before proceeding toe step ST17.

At step ST17, the CPU performs the updating processing, now explained with reference to FIG. 12, to terminate the startup processing. The CPU 9 is then in a standby state.

Figure 12:
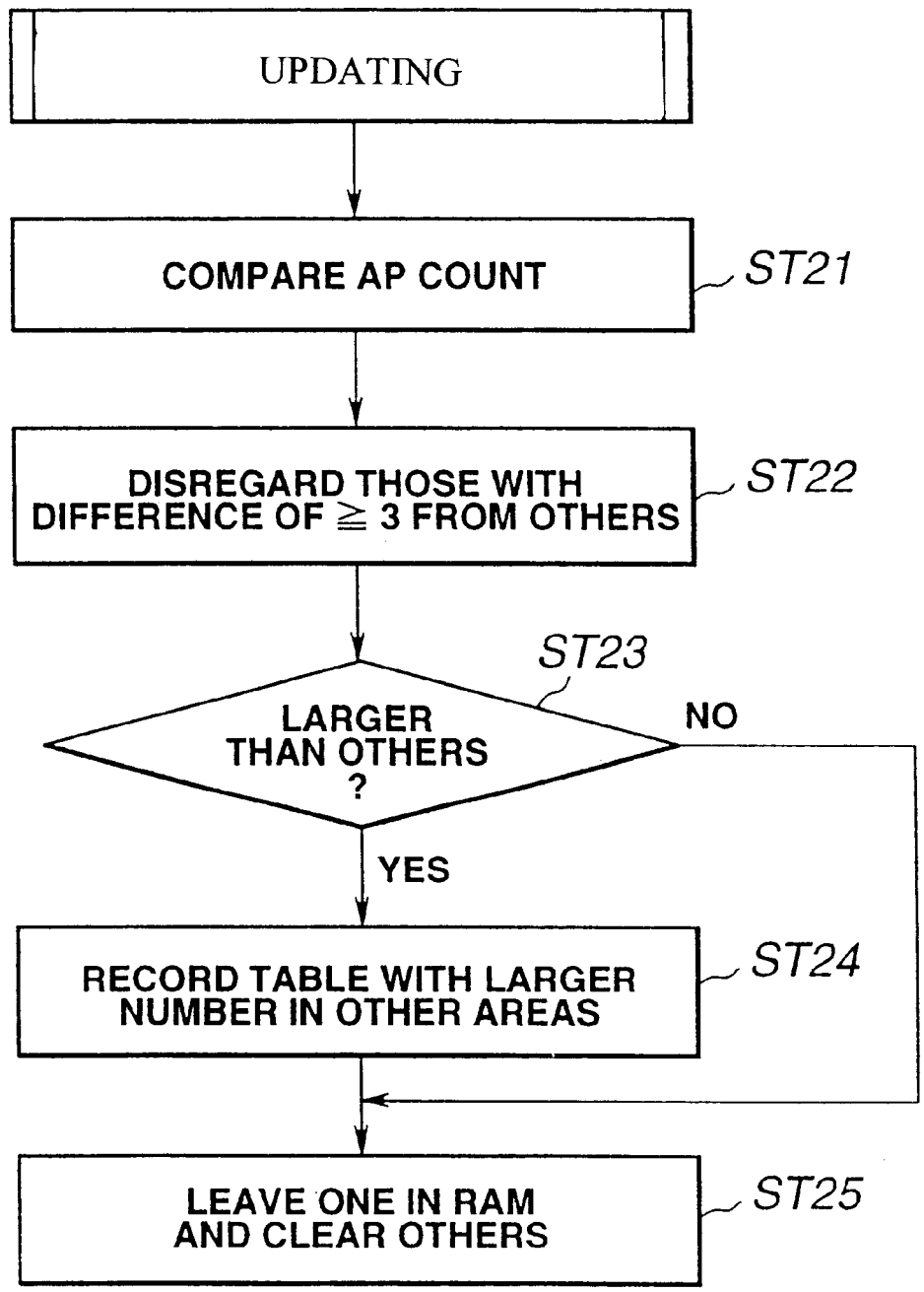
FIG. 12 is a flowchart for illustrating the updating processing for updating a root area in the processing on startup of an information recording/reproducing apparatus embodying the present invention.

Referring to FIG. 12, the updating processing at step ST12 is explained. FIG. 12 is a flowchart for illustrating the updating processing of the root area. First, at step ST21, the CPU 9 compares the A P count of the two root areas in the lead-in region and the A P count of two root areas in the backup region, before proceeding to step ST22.

At step ST22, of the A P counts of the root area in the lead-in region and the A P counts in the root area in the backup region, totalling four A p counts, those having the difference equal to three or more is disregarded, before the CPU proceeds to step ST23. That is, at step ST22, the four A P counts are compared to one another and, if a given A P count differs by three or more from the remaining A P counts, this A P count is excluded.

At step ST23, it is verified whether or not the A P count in the lead-in region is larger than the A P count in the backup region. If the result is YES, the CPU proceeds to step ST24 and, if otherwise, the CPU proceeds to step ST25. That is, at this step ST23, the root area having the largest one of the A P counts of the plural root areas is selected.

At step ST24, the larger A P count selected at step ST23 is recorded in the remaining area in a RAM 10 before the CPU proceeds to step ST25.

At step ST25, only one data updated in the RAM 10 is left while the remaining data are cleared to terminate the updating processing in the root area. The CPU then proceeds to step ST13.

Figure 13:
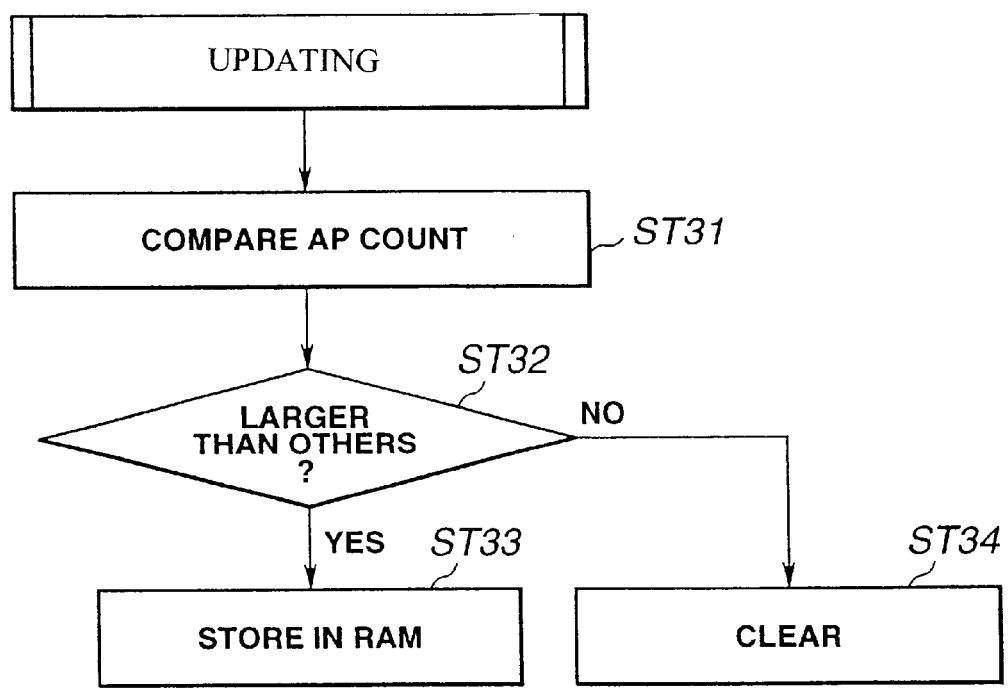
FIG. 13 is a flowchart for illustrating the updating processing for the TOC area and the defect list area in the processing on startup of an information recording/reproducing apparatus embodying the present invention.
Figure 14:
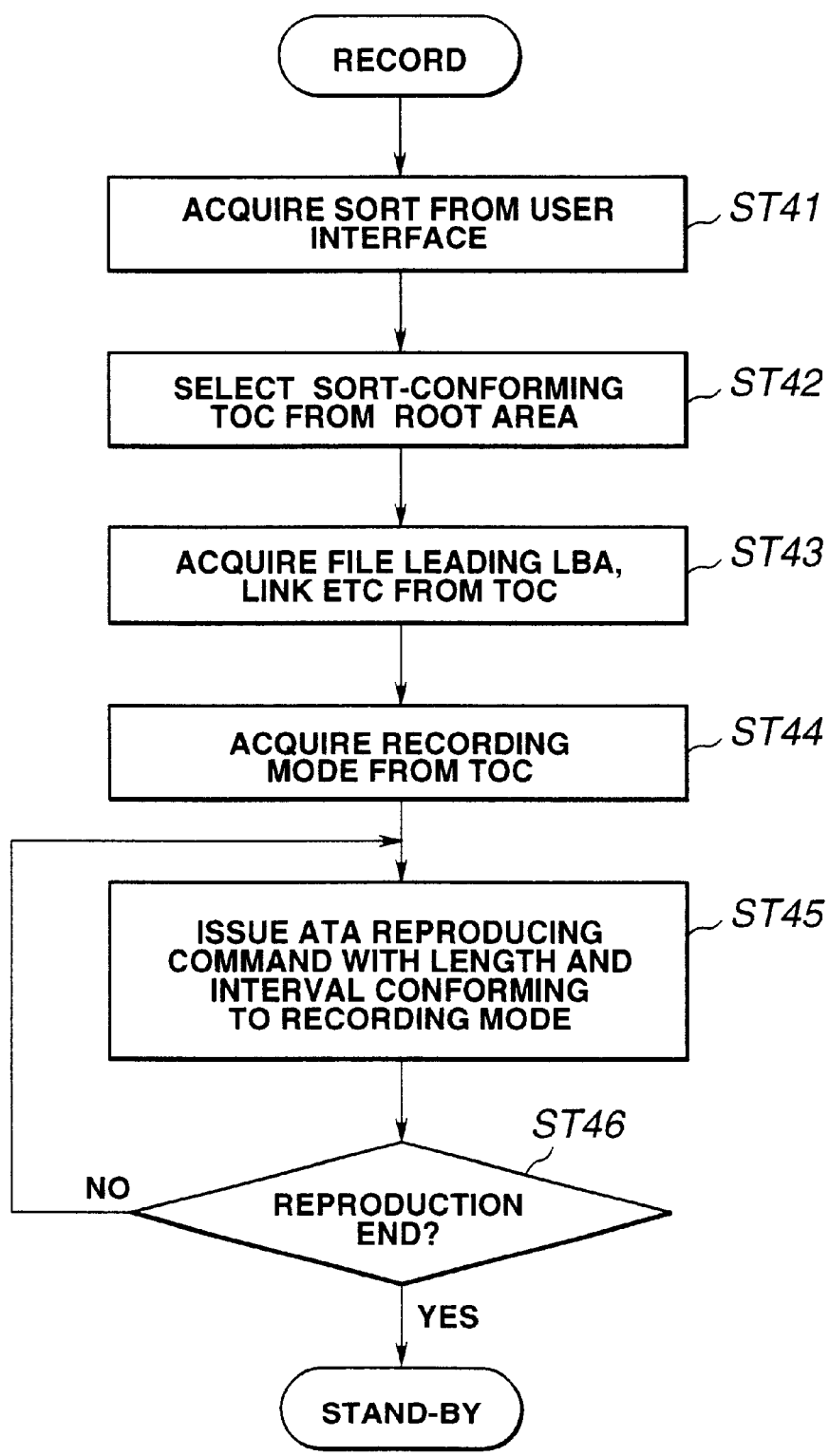
FIG. 14 is a flowchart for illustrating the processing for reproducing AV data by an information recording/reproducing apparatus embodying the present invention.
Figure 15:
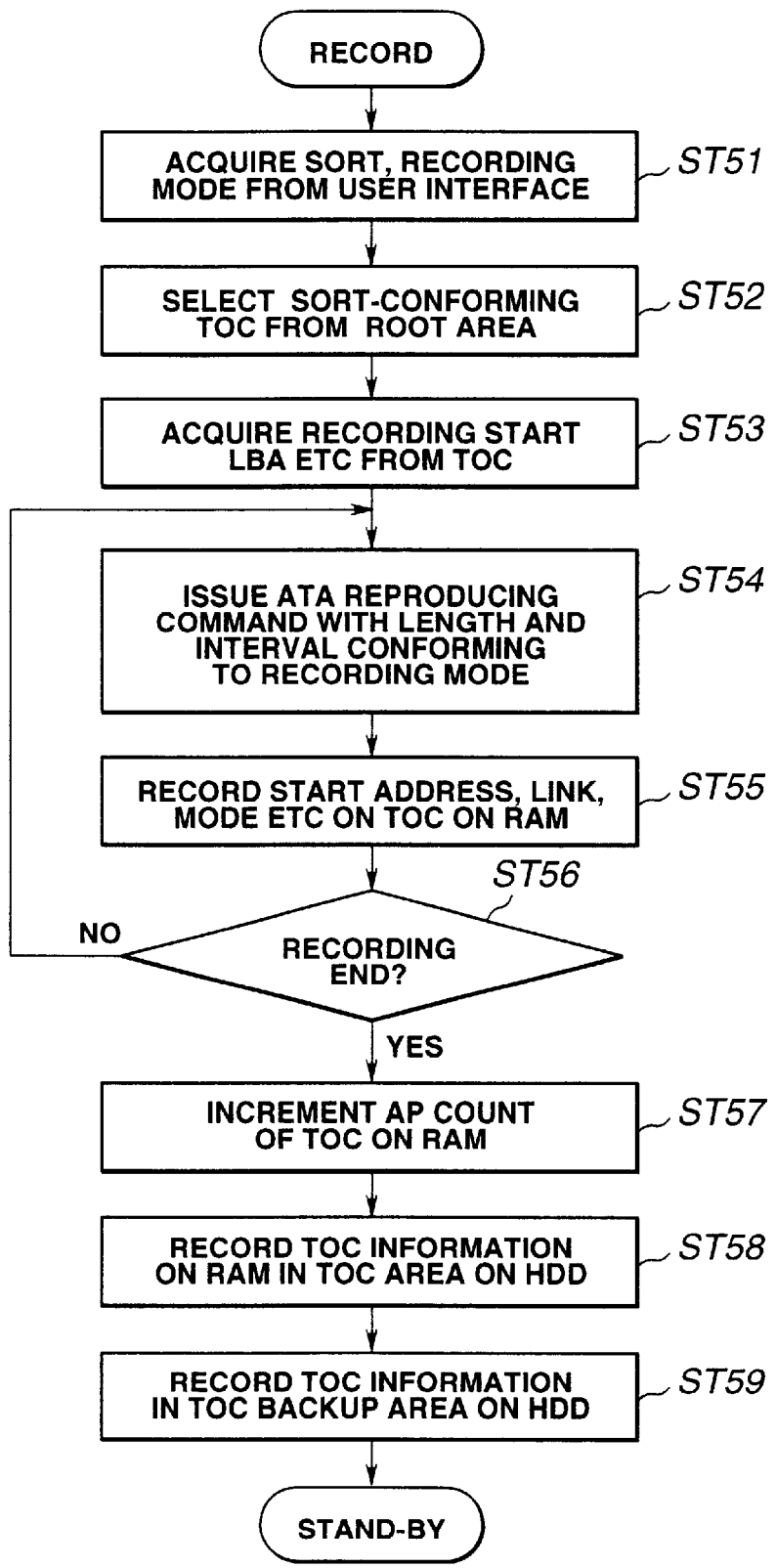
FIG. 15 is a flowchart for illustrating the processing for recording AV data by the information recording/reproducing apparatus embodying the present invention.

Referring to FIG. 13, the updating processing at step ST15 and at step ST17 is explained. FIG. 13 is a flowchart showing the updating processing for the TOC area and the defect list area. The processing shown in this flowchart is similar to that shown in FIG. 12. At step ST31, the A P count of the TOC area or the defect list area in the first system region reproduced at step ST14 is compared to the A P count of the TOC area or the defect list area in the backup region before the CPU proceeds to step ST32.

At step ST32, the processing similar to that of step ST23 is performed. That is, the A P count stored in the first system region is compared to the A P count stored in the backup region. If the A P count stored in the first system region is larger than the A P count stored in the backup region, the CPU proceeds to step ST33 and, if otherwise, the CPU proceeds to step ST34.

At step ST33, the information of the TOC area or the information of the defect list area having the larger A P count is stored in the RAM 10. At step ST34, the information of the TOC area or the information of the defect list area for which the A P count has been verified to be smaller at the above step ST32 is erased from the RAM 10. The result is that only one information of the TOC area or the defect list area is stored in the RAM 10.

By updating the data stored in the lead-in region, system region and the backup region at the startup time, reliability in these regions is maintained.

For reproducing the AV data recorded on the recording medium in the HDD 7 in the information recording/reproducing apparatus 1, an operating input signal is sent at step ST41 from the user to the CPU 9. The CPU is responsive to this actuating input signal to interpret the sorts of the AV data before proceeding to step ST42. Among the sorts of the AV data, there are, for example, the contents of a picture stored in the user data region.

At step ST42, the TOC area is reproduced from the information stored in the root area acquired in the startup operation, depending on the sort of the AV data acquired at step ST41 to select the management information of the contents for reproduction depending on the actuating input signal. The CPU 9 then proceeds to step ST43.

At step ST43, the start LBA of the AV data indicating the contents for reproduction and the LBAs reproduced in continuation to this start LBA are acquired, from the management information of the TOC area selected at step ST42 by the CPU 9, before the CPU 9 proceeds to step ST44.

At step ST44, the recording mode is acquired from the management information of the TOC area selected at step ST42, before the CPU 9 proceeds to step ST45. As the recording mode, there is, for example, the information such as the compression system and the compression rate in the compression system.

At step ST45, the CPU 9 is responsive to the recording mode acquired at step ST44 to send the ATA playback command at a length and an interval in meeting with the recording mode to the ATA adapter 8 to start the reproduction before the CPU proceeds to step ST46. The ATA adapter 8 is responsive to the playback command from the CPU 9 to reproduce the AV data stored in the HDD 7 to send the reproduced AV data via host bus 5 and the interfacing buffer 6 to the multiplexer 19. The multiplexer splits the input AV data into video data and audio data which are reproduced.

At step ST46, the CPU 9 verifies whether or not the totality of the information corresponding to the actuating input signal has bee reproduced. If it is verified that the AV data corresponding to the actuating input signal has not been reproduced, the CPU reverts to step ST45 and, if otherwise, the CPU terminates the playback processing to enter the stand-by state.

When the AV data is to be recorded on a recording medium in the HDD 7 in the information recording/reproducing apparatus 1, an actuating input signal is sent from the user to the CPU 9 at step ST51. The CPU 9 is responsive to this actuating input signal to interpret the sort of the AV data for recording and the recording mode before proceeding to step ST52. Among the sorts of the AV data, there are, for example, the contents of a picture. The recording mode may be exemplified by, for example, the information on the compression system and the information on the compression rate deo the compression system.

At step ST52, the CPU 9 reproduces the TOC area from the information stored in the root area acquired in the startup operation, responsive tot the sort of the AV data acquired at step ST51 to select the management information depending on the recording contents responsive to the actuating input signal. The CPU then proceeds to step ST53.

At step ST53, the CPU 9 acquires the recording start LBA from the management information of the TOC area obtained on selection at step ST52, before proceeding to step ST54.

At step ST54, the CPU 9 generates and outputs an ATA recording command corresponding to the recording mode obtained at step ST51 before proceeding to step ST55.

At this time, the ATA adapter 8 is fed with the ATA recording command from the CPU 9 and with the AV data for recording from the multiplexer 19. The ATA adapter 8 outputs to the HDD 7 the signals and AV data in meeting with the ATA recording command.

It is also possible for the CPU 19 to generate control signals for controlling the compression rate at the time of compressing the information signals by the MPEG2 encoder 18, responsive to the recoding mode obtained at step ST51 to send the generated control signals via host bus 5, interfacing buffer 6 and multiplexer 19 to the multiplexer 19.

At step ST55, the CPU 9 updates the file system 40 stored in the RAM 10 responsive to the contents newly recorded in the user data region of the recording medium of the HDD 7 at the above step ST54. That is, at this step ST55, the TOC area, stating the contents of the AV data recorded in the user data region, the recording mode at the time the contents are recorded, the recording start LBA and the recording end LBA, is updated, before the CPU proceeds to step ST56.

At step ST56, the CPU 9 verifies whether or not the totality of the AV data supplied from the multiplexer 19 has been recorded on the recording medium of the HDD 7. If the result at step ST56 is NO, the CPU reverts to step ST44 to record the remaining AV data. If the result at step ST56 is YES, the CPU proceeds to step ST57.

Since the CPU 9 has updated the contents of the TOC area at step ST55, the CPU 9 at step ST57 increments the A P count stored in the TOC area stored in the RAM 10. The CPU 9 then proceeds to step ST58.

At step ST58, the CPU 9 records the information of the TOC area stored in the RAM 10 in the TOC area in the system region of the HDD 7 before proceeding to step ST59.

At step ST59, the CPU 9 records the information in the TOC area stored in the in the system region recorded at step ST58 directly in the TOC area in the backup region to terminate the recording operation to enter the stand-by state.

Thus, with the above-described recoding processing, the AV data is recorded in the user data region, while the information of the TOC area, varied by recording the AV data, is recorded in the RAM 10 and in the TOC area in the system region and in the backup region. It is possible with the above-described information recording/reproducing apparatus 1 to record and reproduce the AV data simultaneously. Thus, it is possible with the present information recording/reproducing apparatus 1 to record AV data in both the AV data area and in the memo data area, as the AV data recorded in the AV data area is reproduced, if the the AV data area and the memo data area are set in recording and/or reproduction. Also, in this information recording/reproducing apparatus 1, the AV data may be recorded in the AV data area or in the memo data area as the AV data recorded in the AV data area is reproduced. Moreover, in the present information recording/reproducing apparatus 1, AV data may be recorded only in the AV data area, as the AV data area recorded in the memo data area is reproduced, the AV data may be recorded only in the AV data area, or the AV data may be recorded only in the memo data area. That is, in the information recording/reproducing apparatus 1, plural memo data areas may be set responsive to the actuating input signal from the user, and the AV data area and the memo data areas may be recorded or reproduced optionally.

What is claimed is:

1. An information recording apparatus comprising:
    a disc-shaped recording medium having a management information region and a user data region having a first data area and a second data area, said first data area and said second data area having a ring storage structure recording format; and
    recording means for continuously recording audio/video data in said user data region from a recording start logical block to a recording end logical block and for again recording the audio/video data from the recording start logical block;
    wherein said recording means includes means for preventing file fragmentation and for assuring continuity of the recorded audio/video data in said second data area and wherein said recording means records at least a portion of said audio/video data recorded in said first data area temporally continuously into said second data area; and
    wherein said recording means controls a frequency of the audio/video data in each said data area to hierarchize recording durability from one said data area to another.

2. The information recording apparatus according to claim 1 wherein said recording means includes
    splitting means for splitting a user data region of said disc-shaped recording medium into a plurality of data areas, continuously recording said audio/video data from a recording start logical block to a recording end logical block from one data area to another and again recording the audio/video data from the recording start logical block.

3. The information recording apparatus according to claim 2 wherein said recording means includes
    control means for varying the frequency of recording of said recording areas to record said audio/video data.

4. The information recording apparatus according to claim 3 wherein said control means includes recording means for recording at least a portion of said audio/video data recorded in a first data area among said plural data areas in data areas other than said first data area.

5. The information recording apparatus according to claim 4 wherein said recording means when recording said audio/video data recorded in said first data area in certain ones of said plural data areas vary the compression rate of the audio/video data for doing the recording.

6. The information recording apparatus according to claim 2 wherein there are provided n disc-shaped recording medium and wherein
    said recording means includes means for splitting said data areas as the capacity of the user data region of said disc-shaped recording medium is n-tupled responsive to an actuation command of said actuation input means.

7. The information recording apparatus according to claim 2 wherein there are provided n disc-shaped recording mediums and wherein
    said recording means includes splitting means for splitting the user data region of each disc-shaped recording medium into m data areas responsive to an actuation command of said actuation input means for splitting into n×m data areas.

8. The information recording apparatus according to claim 1 wherein, if the time for one complete revolution of the disc-shaped recording medium is r, the seek time required for the recording means to move from the innermost rim to the outermost rim of the disc-shaped recording medium is t and the angle of rotation for the seek time t is θ, the recording start logical block and the recording end logical block are positioned with a phase offset to meet the relation θ>t/r×360°.

9. The information recording apparatus according to claim 2 wherein said recording means splits each data area into at least two regions, that is an outer rim side region and an inner rim side region of said disc-shaped recording medium, and wherein said recording means records said audio/video data in said outer rim side region from an outer/inner rim side recording start logical block to an inner/outer rim side recording end logical block, said recording means recording said audio/video data in said inner rim side area from the inner/outer rim side recording start logical block to an outer/inner rim side recording end logical block.

10. The information recording apparatus according to claim 1, wherein
    said recording means records said audio/video data with a recording frequency which is hierarchically arranged by plural rings.

11. An information recording method for recording audio/video data on a disc-shaped recording medium having a management information region and a user data region having a first data area and a second data area, said first data area and said second data area having a ring storage structure recording format comprising the steps of:
    continuously recording said audio/video data in said user data region from a recording start logical block to a recording end logical block of the disc-shaped recording medium and for again recording the audio/video data from the recording start logical block by use of a recording means, and preventing file fragmentation and assuring continuity of the recorded audio/video data in said second data area, wherein at least a portion of said audio/video data recorded in said first data area are temporally continuously recorded into said second data area; and wherein said recording means controls a frequency of the audio/video data in each said data area to hierarchize recording durability from one said data area to another.

12. The information recording method according to claim 11 wherein said recording step includes splitting the user data region into a plurality of data areas; and continuously recording said audio/video data in each data area as from the recording start logical block to the recording end logical block of said disc-shaped recording medium and again recording said audio/video data as from the recording start logical block.

13. The information recording method according to claim 12 wherein said recording step includes recording at least a portion of said audio/video data recorded in a first data area among said plural areas in data areas other than said first data area.

14. The information recording method according to claim 11 wherein said user area region has a recording start logical block arrayed at a position corresponding to the time required for movement from a position of the recording start logical block to a recording end logical block.

15. The information recording method according to claim 12 wherein, when recording said audio/video data on n disc-shaped recording mediums, said recording step includes n-tupling the capacity of the user data region of said disc-shaped recording medium for doing the recording.

16. The information recording method according to claim 12 wherein, when recording said audio/video data on n disc-shaped recording mediums, said recording step includes splitting the user data region of each disc-shaped recording medium into m data areas for splitting into n×m data areas for doing the recording.

17. The information recording method according to claim 11 wherein said recording step includes splitting each data area into at least two regions, namely an outer rim side region and an inner rim side region; and recording said audio/video data in an outer rim side region from an outer/inner rim side recording start logical block to an inner/outer rim side recording end logical block and also recording said audio/video data in an inner rim side region from an inner/outer rim side recording start logical block to an outer/inner rim side recording end logical block.

18. The information recording method according to claim 11, wherein said audio/video data are recorded with a recording frequency which is hierarchically arranged by plural rings.

19. An information recording/reproducing apparatus comprising:

a disc-shaped recording medium having a management information region and a user data region having a first data area and a second data area, said first data area and said second data area having a ring storage structure recording format;

recording means for continuously recording said audio/video data in said user data region from a recording start logical block to a recording end logical block and for again recording the audio/video data from the recording start logical block, wherein said recording means includes means for preventing file fragmentation and for assuring continuity of the recorded audio/video data in said second data area by recording and wherein said recording means records at least a portion of said audio/video data recorded in said first data area temporally continuously into said second data area; and reproducing means for reproducing said audio/video data stored in said recording means;

said recording means and the reproducing means recording said audio/video data in the user data region of said disc-shaped recording medium and reproducing the audio/video data recorded in the user data region of the disc-shaped recording medium; and wherein said recording means controls a frequency of the audio/video data in each said data area to hierarchize recording durability from one said data area to another.

20. The information recording/reproducing apparatus according to claim 19 wherein said recording means includes splitting means for splitting the user data region of said disc-shaped recording medium into a plurality of data areas.

21. The information recording apparatus according to claim 19, wherein said recording means records said audio/video data with a recording frequency which is hierarchically arranged by plural rings.

22. An information recording/reproducing method for recording said audio/video data on a disc-shaped recording medium having a management information region and a user data region having a first data area and a second data area, said first data area and said second data area having a ring storage structure recording format, said method comprising the steps of:

continuously recording by use of a recording means said audio/video data from a recording start logical block to a recording end logical block of the disc-shaped recording medium having a management information region and a user data region made up of a plurality of logical blocks, and again recording information from the recording start logical block, preventing file fragmentation and assuring continuity of the recorded audio/video data in said second data area, wherein at least a portion of said audio/video data recorded in said first data area are temporally continuously recorded into said second data area; and reproducing the audio/video data recorded in the user data region of the disc-shaped recording medium; and wherein said recording means controls a frequency of the audio/video data in each said data area to hierarchize recording durability from one said data area to another.

23. The information recording/reproducing method according to claim 22 further comprising:

splitting the user data region of said disc-shaped recording medium into a plurality of data areas; and recording information in said data area while reproducing said audio/video data recorded in the user data region of the disc-shaped recording medium.

24. The information recording method according to claim 22, wherein said audio/video data are recorded with a recording frequency which is hierarchically arranged by plural rings.

* * * * *